US012700744B2

(12) United States Patent
Singh

(10) Patent No.: US 12,700,744 B2
(45) Date of Patent: Aug. 4, 2026

(54) SYSTEMS AND METHODS FOR WIRELESS CHARGING

(71) Applicant: Capital One Services, LLC, McLean, VA (US)

(72) Inventor: Gurjot Singh, Gainesville, VA (US)

(73) Assignee: Capital One Services, LLC, McLean, VA (US)

( * ) Notice: Subject to any disclaimer, the term of this patent is extended or adjusted under 35 U.S.C. 154(b) by 562 days.

(21) Appl. No.: 18/058,581

(22) Filed: Nov. 23, 2022

(65) Prior Publication Data

US 2024/0170984 A1     May 23, 2024

(51) Int. Cl.
| | |
|---|---|
| *H02J 7/70* | (2026.01) |
| *G06F 1/16* | (2006.01) |
| *H02J 7/80* | (2026.01) |
| *H02J 50/10* | (2016.01) |
| *H02J 50/90* | (2016.01) |

(52) U.S. Cl.
CPC ............ *H02J 7/731* (2026.01); *G06F 1/1632* (2013.01); *H02J 7/80* (2026.01); *H02J 50/10* (2016.02); *H02J 50/90* (2016.02)

(58) Field of Classification Search
CPC ........ H02J 7/0044; H02J 7/0047; H02J 50/10; H02J 50/90; H02J 7/0042; G06F 1/1632; G06F 1/1616; G06F 1/1626; G06F 1/1635; G06F 1/266
See application file for complete search history.

(56) References Cited

U.S. PATENT DOCUMENTS

| | | | | |
|---|---|---|---|---|
| 7,656,386 | B1 * | 2/2010 | Goldbaum | .......... G06F 3/03548 |
| | | | | 345/157 |
| 7,791,311 | B2 | 9/2010 | Sagoo | |
| 9,130,394 | B2 * | 9/2015 | Burdo | ..................... H02J 50/12 |
| 9,143,000 | B2 | 9/2015 | Leabman et al. | |
| 9,564,773 | B2 | 2/2017 | Pogorelik et al. | |
| 9,577,467 | B1 * | 2/2017 | Karanikos | ............. H02J 50/005 |
| 9,627,913 | B2 | 4/2017 | Maugars | |
| 10,836,326 | B1 * | 11/2020 | Yang | ..................... H04B 1/3877 |
| 11,228,199 | B2 * | 1/2022 | Yang | ........................ H02J 50/10 |
| D1,021,782 | S  * | 4/2024 | Covington | ................... D13/108 |
| 11,994,903 | B2 * | 5/2024 | Azam | ................... G06F 1/1607 |

(Continued)

FOREIGN PATENT DOCUMENTS

EP          2701277 B1      6/2018

OTHER PUBLICATIONS

In Win A1 Plus White Mini-ITX Tower with Integrated ARGB Lighting—650W Gold Power Supply—Qi Wireless Phone Charger—Computer Chassis Case, retrieved from https://www.amazon.com/InWin-A1-Mini-ITX-Integrated-Lighting/dp/B07RSD1KR4 (10 pages).

*Primary Examiner* — Zhipeng Wang
(74) *Attorney, Agent, or Firm* — Bookoff McAndrews, PLLC

(57) ABSTRACT

A computing device may comprise: a housing that defines an interior of the computing device, and a wireless charger that is selectively moveable from a first position to a second position, wherein in the first position, a charging region of the wireless charger within the interior of the housing, and in the second position, the charging region of the wireless charger is outside of the housing and is configured to receive a device for charging.

20 Claims, 3 Drawing Sheets

(56)     References Cited

U.S. PATENT DOCUMENTS

| | | | |
|---|---|---|---|
| 2007/0019375 A1* | 1/2007 | Ligtenberg | G06F 1/1656 |
| | | | 361/679.33 |
| 2010/0194206 A1* | 8/2010 | Burdo | H02J 50/20 |
| | | | 320/108 |
| 2010/0218203 A1* | 8/2010 | Kusumi | G11B 33/123 |
| 2012/0113576 A1* | 5/2012 | Cooper | H02J 7/0044 |
| | | | 307/104 |
| 2013/0099730 A1* | 4/2013 | Yoon | H05K 3/4691 |
| | | | 320/108 |
| 2014/0139034 A1* | 5/2014 | Sankar | H02J 50/80 |
| | | | 307/104 |
| 2018/0131119 A1* | 5/2018 | Makwinski | H02G 3/12 |
| 2020/0169110 A1* | 5/2020 | Yang | H02J 50/005 |
| 2020/0287416 A1* | 9/2020 | Sauterel | G06F 3/03543 |
| 2021/0208626 A1* | 7/2021 | Azam | G06F 1/16 |
| 2022/0029459 A1* | 1/2022 | Sepahvand | H02J 7/342 |
| 2022/0051300 A1* | 2/2022 | Forutanpour | H04B 5/79 |
| 2022/0109319 A1* | 4/2022 | Terry | H01F 38/14 |
| 2022/0167074 A1* | 5/2022 | Patterson | H04R 1/1016 |
| 2022/0413547 A1* | 12/2022 | Sung | G06F 1/1681 |
| 2023/0036419 A1* | 2/2023 | Giffen | H02J 50/005 |
| 2023/0336031 A1* | 10/2023 | Sanchez | H02J 50/10 |
| 2024/0079914 A1* | 3/2024 | Wettroth | H02J 50/402 |
| 2025/0185189 A1* | 6/2025 | Kang | G06F 1/1601 |

* cited by examiner

300

302

MOVING A WIRELESS CHRAGER BETWEEN A FIRST POSITION AND A SECOND POSITION

304

WITH THE WIRELESS CHARGER IN THE SECOND POSITION, OPERATING THE WIRELESS CHARGER SUCH THAT THE WIRELESS CHARGER IS CONFIGURED TO CHARGE A DEVICE RECEIVED BY THE CHARGING REGION

SYSTEMS AND METHODS FOR WIRELESS CHARGING

TECHNICAL FIELD

The present disclosure is directed to systems and methods for a computing device that wirelessly charges devices using a wireless charger.

BACKGROUND

Devices of different brands and designs require different types of charging cords, which often necessitates travelers or other users carry or maintain various types of charging cords that correspond to various devices. Carrying or maintaining numerous charging cords, particularly while traveling, increases the risk that at least one charger will be lost, broken, or stolen.

Travelers or other users may also run into the problem of their numerous chargers being incompatible with foreign outlets and/or plugs. Various types of outlets are used around the world, such as Type A, Type B, Type C, Type D, and Type G. For example, the United States predominantly uses Type A and Type B outlets, while France predominantly uses Type C and Type D, and the United Kingdom predominantly uses Type G. For example, a traveler from the United States may need to purchase new chargers or adaptors to be able to charge devices using French outlets.

Even when travelers or other users seek to correct these problems by traveling with an attachable wireless charger, the attachable wireless charger still has a charging cord to connect to a power source. The wireless charger itself may be lost, broken, stolen, or incompatible with particular outlets or ports. For foreign outlets, the traveler or other user may also have to travel with an adaptor, another item that may be lost in transit. Whether a traveler carries numerous charging cords, a separate wireless charger, or an adaptor, the traveler risks losing one or more of these items. As a result, the traveler or other user may lose the ability to charge their electronic devices.

Conventional techniques, including the foregoing, fail to account for the uncertainty in traveling and the challenge presented by having numerous chargers for different devices and/or different outlets or ports. Losing a charger may cause issues for the traveler if they cannot purchase a new charger for the specific device or if purchasing a new charger is cost prohibitive. Without a streamlined way to transport a universal charging device, carrying separate chargers may be expensive, inefficient, and inconvenient.

This disclosure is directed to addressing the above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, methods and systems are disclosed for wireless charging.

In one aspect, a computing device may include a housing that defines an interior of the computing device, and a wireless charger that is selectively moveable from a first position to a second position, wherein in the first position, a charging region of the wireless charger is within the interior of the housing, and in the second position, the charging region of the wireless charger is outside of the housing and is configured to receive a device for charging.

In another aspect, a method for operating a wireless charger may include: moving the wireless charger between a first position and a second position, wherein in the first position, a charging region of the wireless charger is positioned inside a housing, and in the second position, the charging region of the wireless charger is positioned outside of the housing and is configured to receive a device for charging, and with the wireless charger in the second position, operating the wireless charger such that the wireless charger is configured to charge a device received by the charging region.

In another aspect, an exemplary embodiment of a computing device may include: a housing that defines an interior of the computing device; a wireless charger that is selectively moveable from a first position to a second position, wherein in the first position, a charging region of the wireless charger is positioned within the interior of the computing device, and in the second position, the charging region of the wireless charger is positioned outside of the housing and configured to receive a device for transmitting electrical energy to a battery of the device; an indicator configured to visually indicate an activation status of the wireless charger; a mounting system that supports movement of the wireless charger between the first position and the second position; and an actuator that is operable to move the wireless charger between the first position and the second position.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figures 1A, 1B:
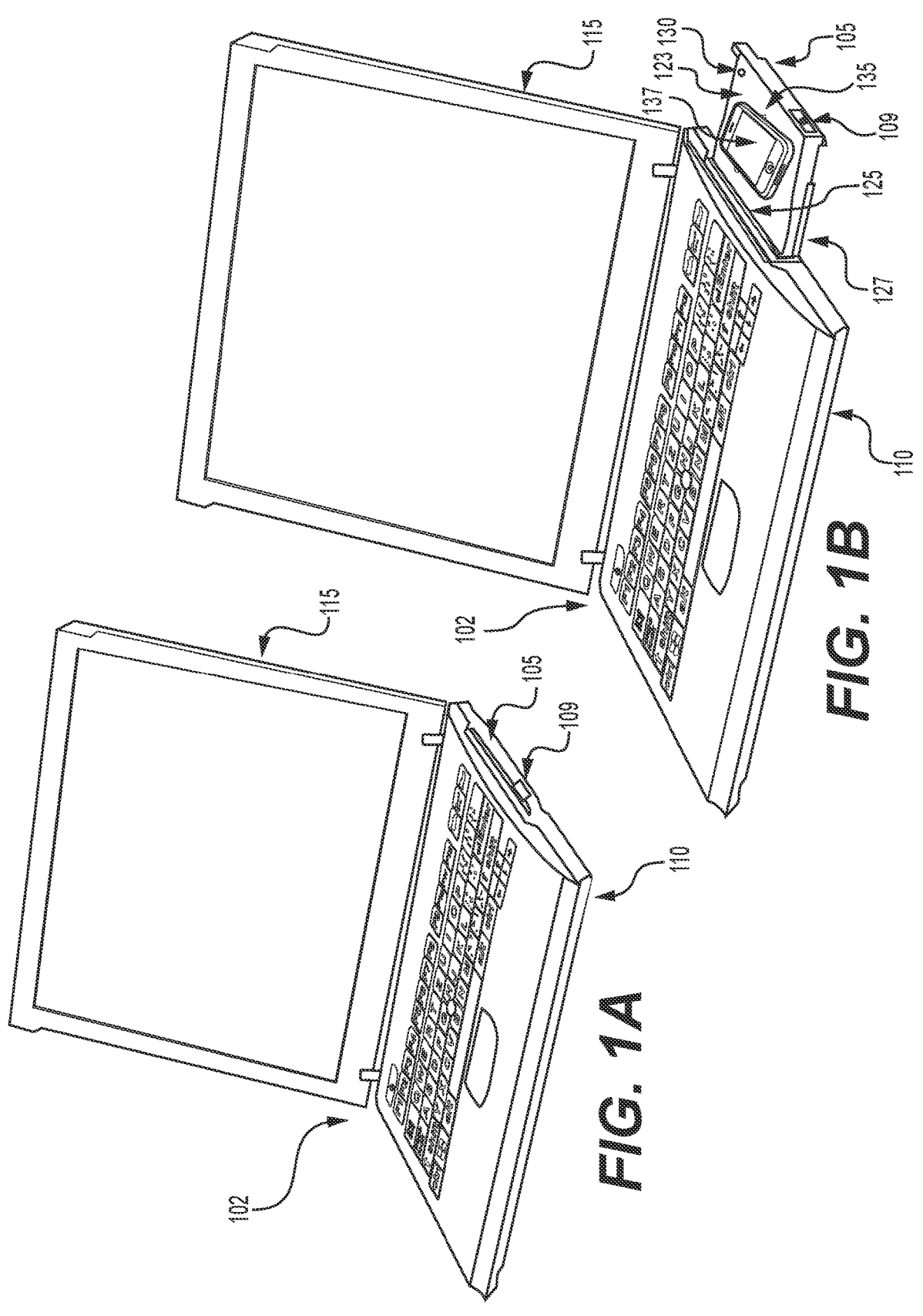
FIG. 1A depicts a portable computer with a wireless charger in a first position, while the top of the portable computer is depicted in an upright position relative to a portable computer base, according to one or more embodiments.
FIG. 1B depicts a portable computer with a wireless charger in a second position, while the top of the portable computer is depicted in an upright position relative to the portable computer base, according to one or more embodiments.

Generally, travelers must carry numerous types of chargers with them for their various devices. For example, a traveler may require one type of charger for their cell phone, another for their tablet, and another for their laptop. Generally, the requirement to travel with various types of chargers is inconvenient, inefficient, and potentially expensive. Accordingly, improvements in technology relating to portable and convenient universal chargers are needed.

According to certain aspects of the disclosure, methods and systems are disclosed for a computing device with a moveable wireless charger. This device may streamline travel by minimizing the number of chargers (e.g., the number of distinct chargers) a traveler may need to carry. This device may also increase convenience by incorporating (e.g., embedding) a charger within an appliance that individuals generally travel with: a laptop.

Reference to any particular activity is provided in this disclosure only for convenience and not intended to limit the disclosure. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

It will also be understood that, although the terms first, second, third, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Terms such as "item," "object," or the like generally encompass a good, service, or the like having ownership or other rights that may be transferred. As used herein, "user, "traveler," or the like generally encompasses any person or entity that may use or operate a device, such as a computer or other machine. As used herein, terms such as "computing device" or the like generally encompass any electronic equipment controlled by a central processing unit or that is configured to perform calculations. Examples of computing devices include, but are not limited to, a laptop, a tablet computer ("tablet"), a desktop tower, or a cellphone. As used herein, terms such as "mounting system" or the like generally encompass mechanisms that facilitate the movement or support of objects. Terms like "adaptor" or the like generally encompass a physical device that allows a hardware or electronic interface to be adapted (accommodated without loss of function) to another hardware or electronic interface.

According to an example of the disclosed subject matter, a user may desire to travel with multiple devices and not carry a different charger for each device. Carrying multiple chargers may be troublesome, particularly when each device requires a unique charger. For example, a user may travel with a cell phone, a tablet, and a laptop. Each of these devices may require a different charger type to replenish power (e.g., a Universal Serial Bus ("USB") Type-A, USB Type-B, USB Type-C, USB-B Micro/Mini, or a proprietary (e.g., non-standard) charger such as a "Lightning" charger). As a specific example, the cell phone may require a USB-B Micro charger, the tablet may require a proprietary charger (e.g., a "Lightning" charger), and the laptop may require a USB Type-C charger. Even if the user carried a multi-charger cable, which combines different types of chargers together, the user would still have to travel with the multi-charger cable, which may be bulky and easily lost. In this instance, if the traveler loses the multi-charger cable, they lose all of their chargers rather than perhaps only one.

Further, chargers are often connected to converters that allow the charger's cord to plug into a wall outlet. For example, a USB Type-A charger may connect with a converter with a USB Type-A port and a two-prong adaptor. These components may easily be separated, requiring one or more parts to be replaced, and adding more items that must be carried and may be lost when traveling.

Further, even if a user traveled with a wireless charger that may be plugged into the wall or a laptop, the user may still run the risk of losing the wireless charger. The user must also make sure the wireless charger's plug type matches the available ports on the laptop, otherwise the wireless charger may be unusable. Thus, it may be desirable to improve wireless charging availability, e.g., by incorporating (e.g., embedding) a wireless charger within a portable computer.

According to an example implementation, a wireless charger may be incorporated within a computing device. Having a wireless charger incorporated in (e.g., stored within an interior of) a computing device may reduce the amount of chargers and separate (e.g., disparate) charge equipment required to keep devices powered. The wireless charger may be stored within a housing of the computing device, such as within a base of a portable computer and accessible via an actuator, e.g., a button or the like. A mounting system may move or support the movement of the wireless charger from the interior of the housing to an exterior of the housing. The mounting system may be motorized. The portable computer, the wireless charger, and the mounting system may be powered by the computing device's battery, by a wall plug, or by any other suitable power source. The wireless charger may have a body in any suitable style (e.g., solid-state, foldable, or flexible) or shape (e.g., circular or rectangular). The wireless charger may have a charging region with any suitable operating format (e.g., electromagnetic induction). An indicator may be connected to the wireless charger and provide a signal (e.g., audio and/or visual) when the wireless charger is active and/or when the wireless charger has completed charging the device. The indicator may be a light, e.g., an LED light, that changes colors as the device is charged. For example, the light may be red while the device is charging, and turn green when the device has finished charging. In another example, the light may flash when the device has completed charging. Any suitable form of indicator may be used with any combination of indicating colors, styles, etc.

In some embodiments, the portable computer may be any suitable device, e.g., a laptop, a tablet, or a cell phone. The wireless charger may be incorporated within the portable computer in any suitable location or manner. For example, the wireless charger may be incorporated in the base of a laptop. The wireless charger may be incorporated within a housing of the computing device. The housing may be any suitable shape, style, or size. The design of the housing may correspond to the type of wireless charger and/or mounting system. For example, a flexible wireless charger may have a cylindrical housing. This style of housing may enable the flexible wireless charger to be stored while rolled up. In another example, a solid-state wireless charger may have a tray mounting system and a cuboid housing. The wireless charger, housing, and mounting systems may be different sizes and/or styles to fit within differently sized computing devices. For example, a tablet may have a smaller wireless charger, housing, and/or mounting system than a laptop.

In some embodiments, the computing device may have an actuator (e.g., a button or a switch) that activates the mounting system and/or the wireless charger. In some embodiments, activating the actuator may make the wireless charger accessible, e.g., by opening the housing so that a user may manually move the wireless charger from the interior of the housing to outside the housing. In some embodiments, when the actuator is activated, the mounting system may automatically (e.g., without further user action) move the wireless charger between a first position (e.g., a storage or inactive position located within the house) and a second position (e.g., an accessible or usable position located externally of the housing). For example, activating the actuator may make the wireless charger accessible by activating the mounting system to move the wireless charger to the second position. Activating the actuator may also cause the mounting system to move the wireless charger from the second position to the first position.

The actuator may be any suitable style, shape, format, or quantity. For example, the actuator may be a button, a pushbutton switch, a joystick switch, a temperature switch, a rotary switch, a slide switch, a remote actuator, or any other suitable style, shape, or format. The computing device may have one or more actuators connected to various aspects of the device, each actuator performing an activation function, a deactivation function, or both an activation function and a deactivation function. For example, the computing device may have a joystick switch connected to the exterior of the laptop and a pushbutton switch connected to the wireless charger. A first activation of the joystick switch may activate the mounting system to move the wireless charger from a first position to a second position. A first activation of the pushbutton switch while the wireless charger is in the second position may activate the wireless charger. A second activation of the pushbutton switch while the wireless charger is in the second position may deactivate the wireless charger. A second activation of the joystick switch may activate the mounting system to move the wireless charger from a second position to a first position.

In another example, a computing device may have a joystick switch connected to the exterior of the computing device, a slide switch connected to the charging region of the wireless charger, and a pushbutton switch connected to the body of the wireless charger. Activation of the joystick switch may activate the mounting system to move the wireless charger from a first position to a second position. When the wireless charger is in the second position, a first activation of the slide switch may activate the wireless charger. A second activation of the slide switch may deactivate the wireless charger. Activation of the pushbutton switch may activate the mounting system to move the wireless charger from a second position to a first position.

In some embodiments, the actuator, the computing device, the mounting system, and/or the wireless charger may be remotely activated. The actuator may comprise a remote and include a remote operating format, e.g., a short-range radio transmitter, and the computing device, the mounting system, and/or the wireless charger may include a receiver. For example, activation of a remote actuator may activate the mounting system, causing the wireless charger to move between the first position and second position. In another example, the mounting system may be activated when a joystick actuator is activated, which may cause the wireless charger to move from the first position to the second position; the wireless charger may be activated by a remote actuator.

In some embodiments, the wireless charger may have different shapes (e.g., cuboid, cylindrical, cradle- or bowl-like) and/or styles (e.g., solid-state, flexible, or foldable), which may correspond to different mounting mechanisms (e.g., tray, slot, top-load, or spring). The computing device may have any suitable combination of wireless charger and mounting mechanism. In an example where the wireless charger is solid-state, the mounting mechanism may be a tray mounting system. In another example, the wireless charger may be foldable, which may correspond to a slot mounting system. Any suitable form of mounting system and any suitable form of wireless charger may be used in any suitable combination. For example, a tray mounting system may be used with a foldable wireless charger.

A tray mounting system may operate by a motor, e.g., a direct current ("DC") motor, moving the wireless charger. The tray mounting system may connect with the wireless charger in any suitable manner, e.g., via screws, grommets, incorporated rods, track systems, soldering, welding, or the like. In some embodiments, a tray mounting system may comprise rods that are operatively connected to the tray mounting system motor and extend from the tray mounting system into the wireless charger body. The rods may cause the wireless charger to move and may support the wireless charger when moved. A first activation of the tray mounting system motor may move the tray mounting system rods from the first position to the second position, causing the wireless charger to move from the first position to the second position. A second activation of the tray mounting system motor may move the tray mounting system rods from the second position to the first position, causing the wireless charger to move from the second position to the first position.

In another embodiment, the tray mounting system may comprise one or more tracks that may be operatively connected to the tray mounting system motor and extend beneath the wireless charger, e.g., a solid-state wireless charger. The wireless charger may connect to the one or more tracks by any suitable means, such as by connective elements or features (e.g., friction fit, snap fit, clips, threaded portions, Luer lock connectors, tabs, etc.), screws, soldering, welding, or the like. When the tray mounting system motor is activated, the wireless charger may be moved between the first position and the second position along the tracks, which may extend to the exterior of the housing.

A slot mounting system may comprise a motor, e.g., a DC motor, and a feed shaft in which the wireless charger, e.g., a foldable wireless charger, may be inserted. The interior of the feed shaft may include a series of one or more motorized rollers that are operatively connected to the slot mounting system motor. In some embodiments, activation of the actuator may activate the motor to move the wireless charger along the one or more motorized rollers to move the wireless charger from a first position to a second position. The wireless charger may be moved from a second position to a first position by the user inserting the wireless charger into the housing, which may activate the slot mounting system motor and cause the one or more motorized rollers to move the wireless charger to the interior of the housing.

A top-load mounting system may comprise a motor and a housing accessible by moving an upper section, e.g., a lid. Activation of the top-load mounting system motor may cause the upper section of the housing to open. The user may be able to access the housing and the wireless charger through this opening. The user may manually move the upper section or may activate the actuator to close the housing.

In some embodiments, the top-load mounting mechanism may be activated in the absence of computing device battery power. The actuator for the top-load mounting mechanism may be a spring-loaded locking mechanism. When activated, the actuator may release the upper section. The upper section may be spring-loaded and move away from the housing when released by the actuator. The user may manually move the wireless charger between the first position and the second position. The housing may be closed by the user manually moving the upper section toward the housing.

While this disclosure discusses tray mounting systems, slot mounting systems, and top-load mounting systems, other mounting systems may be used in various embodiments, e.g., a caddy mounting system. In one example, the mounting system may be a spring mounting system. In this example, the spring mounting system may include one or more springs or any other suitable bias member, and one or more retainer. The one or more springs may be connected to the housing, e.g., to the housing walls, and/or may be connected to the exterior surface of the mounting system. When the spring mounting system is moved inside the housing, e.g., using one or more tracks as discussed herein, the one or more springs may become compressed.

The retainer may be configured to keep the spring mounting mechanism retained within the housing, e.g., while the springs may be compressed. The retainer may be any suitable form or configuration, e.g., a hinge, latch, lock, etc. In an example where the retainer is a latch, the latch may be connected to the exterior of the laptop and be configured to mechanically contact the exterior of the wireless charger, creating an opposing force on the exterior of the wireless charger to retain the wireless charger within the housing. In an example where the retainer is a hinge, the hinge may be connected to the interior wall of the housing and/or the exterior wall of the wireless charger. The hinge may be configured to lock when folded, e.g., when the spring mounting tray is moved within the housing.

A user may activate the actuator, which may be configured to activate or release the retainer, enabling the spring mounting mechanism to move the wireless charger from inside the housing to outside the housing. In the example where the retainer is a latch, the latch may be mechanically moved by the user, allowing the springs to decompress and push the wireless charger to outside the housing. In the example where the retainer is a hinge, the activated actuator may be configured to unlock the hinge, which may allow the springs to decompress and push the wireless charger outside the housing.

It should be understood that the discussed mounting mechanisms may not be mutually exclusive. For example, the mounting mechanism may have a combination mounting system wherein the wireless charger may be accessed through a top-load section, e.g., an upper lid, and may be moved using a spring system. Any suitable combination of mounting systems may be used.

The wireless charger may operate by one or more operating formats (now known or later developed without departing from the scope of this disclosure), such as electromagnetic induction, through-surface, and/or uncoupled radio frequency. Electromagnetic induction is the process by which voltage is produced across a conductor placed in a changing magnetic field or a conductor moving through a stationary magnetic field. The wireless charger may have an incorporated primary coil and the device to be charged may have an incorporated secondary coil. When the wireless charger is activated, alternating current may flow through it, creating an electromagnetic field. When a device to be charged is placed within that field, an electrical current may be generated in the secondary coil. The alternating current from the primary coil is converted to a direct current in the second coil. The direct current is used to charge the device's battery.

In some embodiments, the wireless charger may be able to detect various characteristics of the one or more devices received at the charging region, e.g., the type of device received, the charge of the device received, the battery capacity of the device received, etc. The wireless charger may have sensors that may enable the wireless charger to detect these characteristics. Depending on the characteristics the wireless charger detects, the wireless charger may be able to customize the manner in which it charges the device. For example, if the wireless charger determines that the charging region has received headphones, the wireless charger may reduce the charging rate to accommodate the smaller battery capacity within the headphones. In another example, if the wireless charger determines that the charging region has received a tablet, the wireless charger may increase the charging rate to account for the larger battery capacity of the tablet.

In some embodiments, the portable computer, wireless charger, and/or mounting system may be powered by internal or external power sources. Internal power sources may include one or more batteries internal to the portable computer. External power sources may include power banks, outlets, etc. For example, the portable computer and/or the portable computer's internal battery may receive power from a wall outlet. In some embodiments, the wireless charger may be removable from the computing device, the computing device battery, the mounting mechanism, and/or the housing. In these embodiments, the wireless charger may receive power from an external source. The wireless charger may be connected to the computing device's battery in a way that allows for it to be disconnected. For example, the wireless charger may have a USB Type-A connector that may connect to the computing device's battery USB Type-A port. In this example, the wireless charger may be disconnected from the computing device's USB Type-A port, removed from the housing, and connected to a USB Type-A port external to the computing device. The wireless charger may be placed back into the housing and reattached to the computing device and the computing device battery. In some embodiments, the wireless charger, the mounting system, and/or the housing may be exchangeable. For example, a user may exchange a solid-state wireless charger with a tray mounting system for a foldable wireless charger with a slot mounting system.

While several of the examples above involve a solid-state wireless charger and tray mounting system incorporated in a portable computer, it should be understood that the styles and techniques according to this disclosure may be adapted to any suitable type of computing device, wireless charger, mounting system, or any combination thereof. It should also be understood that the examples herein are illustrative only. The techniques and technologies of this disclosure may be adapted to any suitable configuration or activity.

FIGS. 1A-1B depict a portable computer with an incorporated wireless charger. As described above, the computing device may be a portable computer, but may be other devices, e.g., a tablet. FIG. 1A depicts a portable computer 102 with wireless charger 105 in a first position within portable computer base 110, while portable computer top 115 is depicted in an upright position relative to portable computer base 110. Portable computer base 110 may house a battery. As described in further detail below, the battery may power portable computer 102, wireless charger 105, both portable computer 102 and wireless charger 105, and/or other aspects of the device, e.g., the mounting system. Actuator 109 may be coupled to wireless charger 105, portable computer base 110, portable computer top 115, or any other suitable place.

FIG. 1B depicts portable computer 102 with wireless charger 105 in a second position outside of portable computer base 110, while portable computer top 115 is depicted in an upright position relative to portable computer base 110. FIG. 1B further depicts actuator 109, a wireless charger body 123, a housing 125, a mounting system 127, an indicator 130, a charging region 135, and a device 137 positioned for charging on charging region 135 of wireless charger body 123 (herein referred to as "device").

As described herein, actuator 109 may be any suitable form or style (e.g., a button or a switch) and may be connected to any suitable location of portable computer 102 (e.g., portable computer base 110) and/or wireless charger 105.

As discussed herein, wireless charger body 123 may be any suitable form, e.g., solid-state, foldable, or flexible. Wireless charger body 123 and mounting system 127 may connect by any suitable means, e.g., screws, grommets, hinges, and/or the like, or by any suitable manner, e.g., movably, stationary, etc. For example, mounting system 127 and wireless charger body 123 may be connected by screws such that when mounting system 127 moves wireless charger body 123, the connection point between mounting system 127 and wireless charger body 123 may be moveable. A moveable connection point between mounting system 127 and wireless charger body 123 may accommodate and/or support the movement of wireless charger 105. In another example, mounting system 127 and wireless charger body 123 are immovably connected, such that when mounting system 127 moves wireless charger body 123, the connection point between mounting system 127 and wireless charger body 123 may not move. In this example, other aspects of the mounting system 127 may move, as described herein.

Wireless charger body 123 may comprise charging region 135. Charging region 135 may receive device 137. As discussed in more detail below, wireless charger body 123 and/or charging region 135 may include one or more sensors. The one or more sensors may detect various characteristics of device 137 and/or the presence of device 137 in charging region 135.

Housing 125 may be incorporated within portable computer base 110. In some embodiments, housing 125 may be incorporated in other aspects of the computing device, e.g., portable computer top 115. Housing 125 may include a structure defining a space for receipt of wireless charger 105 and/or mounting system 127. In other words, housing 125 may define a location within portable computer 102 within which wireless charger 105 and mounting system 127 may be stored while in the first position (e.g., the storage position of FIG. 1A). The shape and size of housing 125 may correspond to the shape and size of wireless charger 105 so as to provide sufficient space for receipt thereof.

Indicator 130 may be mounted on wireless charger 105, e.g., on charging region 135. Indicator 130 may provide an audio and/or visual indication relating to the statuses of wireless charger 105, device 137, the battery of portable computer 102, and/or any other relevant status. Charging region 135 may be in any suitable shape, e.g., flat, curved, or cradle-like, that may correspond to at least a portion of the shape of device 137. Charging region 135 may receive device 137 on its surface. Device 137 may be a device capable of wireless charging.

In some embodiments, the internal battery of portable computer 102 ("the battery") may be operatively connected to portable computer 102, to wireless charger 105, to mounting system 127, or to any combination thereof. The battery may receive power and/or charge from an external source and provide power to portable computer 102, wireless charger 105, and/or mounting system 127, or any combination thereof. The external source may be any suitable source, such as a power bank, a charger, a two- or three-pronged outlet, and/or a USB port. As discussed herein, wireless charger 105 may be detached from portable computer 102, mounting system 127, and/or the battery and receive power from an external source. For example, wireless charger 105 may be detached from the battery and connected to a three-prong outlet.

In some embodiments, the battery may selectively provide power to portable computer 102, to wireless charger 105, to mounting system 127, or to any combination thereof. For example, the battery may be operatively connected to both portable computer 102 and wireless charger 105, but may provide power to only wireless charger 105 if portable computer 102 is turned off. In another example, the battery may be operatively connected to both portable computer 102 and wireless charger 105, but provide power to only wireless charger 105 while portable computer 102 may be powered by an external source. There may be any suitable combination of connections between portable computer 102, wireless charger 105, mounting system 127, the battery, and/or an external power source.

Figures 2A, 2B, 2C:
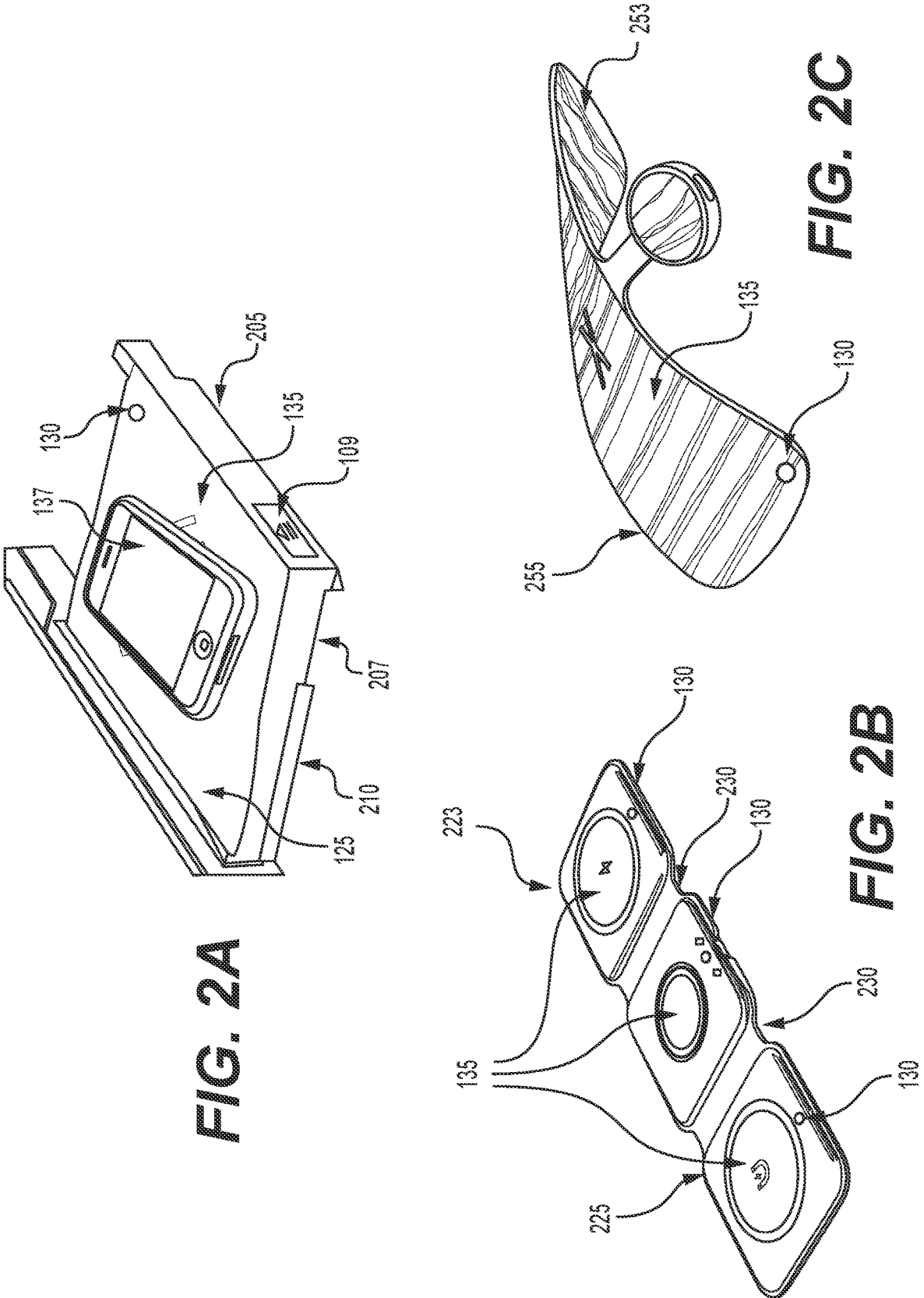
FIG. 2A depicts a wireless charger with a solid-state body and a mounting system operably connected to a portable computer, according to one or more embodiments.
FIG. 2B depicts a foldable wireless charger that is disconnected from a portable computer, according to one or more embodiments.
FIG. 2C depicts a flexible wireless charger that is disconnected from a portable computer, according to one or more embodiments.

FIGS. 2A-2C depict variations of wireless chargers and wireless charger bodies. FIG. 2A depicts a wireless charger 205 that may be solid-state ("solid-state wireless charger") with a tray mounting system 210. Solid-state wireless charger 205 may comprise actuator 109, indicator 130, charging region 135, a solid-state body 207, and a tray mounting system 210.

FIG. 2A depicts an embodiment of solid-state wireless charger 205 that may be connected to portable computer 102, mounting system 127, and/or the battery. In some embodiments, solid-state wireless charger 205 may be removable and/or detachable from portable computer 102, mounting system 127, and/or the battery. When removed, solid-state wireless charger 205 may be operably connected to an internal power source, e.g., the battery, or an external power source, e.g., a power bank, as discussed herein. Solid-state wireless charger 205 may connect to an external power source using any suitable cord or other connection device. The cord may connect to an external power source by any suitable port, e.g., High-Definition Multimedia Interface ("HDMI"), USB, or the like. Solid-state wireless charger 205 may be reconnected to portable computer 102, mounting system 127, and/or the battery.

As described herein, actuator 109 may be any suitable form or style (e.g., a button or a switch) and may be connected to any suitable location of portable computer 102 (e.g., portable computer base 110) and/or solid-state wireless charger 205. As further described herein, indicator 130 may be connected to any suitable aspect of solid-state wireless charger 205 (e.g., charging region 135) and may provide audio and/or visual indications of the statuses of solid-state wireless charger 205, device 137 received by solid-state wireless charger 205, the battery of portable computer 102, and/or any other relevant indication. Charging region 135 may include any features or functionality discussed herein. Charging region 135 may be any suitable shape and/or style discussed herein. For example, charging region 135 of solid-state wireless charger 205 may receive device 137 on a flat (e.g., planar) surface thereof.

In some embodiments, solid-state body 207 may be made of any suitable material, e.g., plastic. Solid-state body 207 may be relatively firm or stable in shape (e.g., rigid or structured so as to support a device 137 received thereon without deflection) and may cause charging region 135 to remain flat while in or moving between the first position (FIG. 1A) and the second position (FIG. 1B). Solid-state body 207 may be connected to tray mounting system 210 such that tray mounting system 210 may move and/or support the movement of solid-state body 207 between the first position and the second position. Tray mounting system 210 may also support solid-state body 207 while solid-state body 207 is in the first position and/or in the second position.

FIG. 2B depicts a wireless charger that may be folded 223 ("foldable wireless charger"). Foldable wireless charger 223 may comprise one or more indicators 130, one or more charging regions 135, and a foldable body 225. While three charging regions 135 and three indicators 130 are depicted in FIG. 2B, the disclosure is not so limited. Rather, two, four or more such charging regions 135 and respective indicators 130 may be included in any suitable combination. For example, foldable wireless charger 223 may include five charging regions 135 and one indicator 130.

FIG. 2B depicts an embodiment of foldable wireless charger 223 that may be disconnected from portable computer 102, mounting system 127, and/or the battery. In some embodiments, foldable wireless charger 223 may be removable and/or detachable from portable computer 102, mounting system 127, and/or the battery. When removed, foldable wireless charger 223 may be operably connected to an internal power source, e.g., the battery, or an external power source, e.g., a power bank, as discussed herein. Foldable wireless charger 223 may connect to an external power source using any suitable cord or other connection device. The cord may connect to an external power source by any suitable port, e.g., HDMI, USB, or the like. Foldable wireless charger 223 may be operatively connected or reconnected to portable computer 102, mounting system 127, and/or the battery.

As described herein, each indicator 130 may provide an audio and/or visual indication of charging activity, e.g., indicator 130 may flash green when device 137 positioned thereon is fully charged. The one or more charging regions 135 may operate in concert or independently and may have sensors, as discussed herein. For example, if a device is received at one of three charging regions, only the respective charging region may be activated. Activation and/or operation of an individual charging region may activate the one or more indicators 130. For example, activation of one of three charging regions 135 may activate the corresponding indicator 130 while the remaining charging regions 135 and/or indicators 130 remain inactive.

Foldable body 225 may include one or more flexion points 230. Foldable body 225 may be folded at the one or more flexion points 230. Foldable body 225 and/or the one or more flexion points 230 may be made of one or more flexing, bending, or hinging materials or devices, e.g., cotton fabric, elastane fabric, plastic hinges, and/or metal hinges. Foldable body 225 may fold and unfold automatically (e.g., using mechanically powered hinges) or manually (e.g., by the user). In some embodiments, foldable wireless charger 223 may be stored within housing 125 while folded, unfolded, or either folded or unfolded. For example, housing 125 may be sized such that foldable wireless charger 223 may fit within housing 125 when foldable body 225 is folded. As discussed herein, foldable wireless charger 223 may move between the first position and the second position via any suitable mounting system, e.g., a slot system, and may do so while folded or unfolded.

FIG. 2C depicts a wireless charger that may be flexible 253 ("flexible wireless charger"), and may comprise indicator 130, charging region 135, and a flexible body 255. FIG. 2C depicts an embodiment of flexible wireless charger 253 that may be disconnected from portable computer 102, mounting system 127, and/or the battery. In some embodiments, flexible wireless charger 253 may be removable and/or detachable from portable computer 102, mounting system 127, and/or the battery. When removed, flexible wireless charger 253 may be operably connected to an external power source, e.g., a power bank, as discussed herein. Flexible wireless charger 253 may connect to an internal power source, e.g., the battery, or an external power source, e.g., a power bank, using any suitable cord or other connection device. The cord may connect to an external power source by any suitable port, e.g., HDMI, USB, or the like. Flexible wireless charger 253 may be operatively connected or reconnected to portable computer 102, mounting system 127, and/or the battery.

As described herein, indicator 130 may provide an audio and/or visual indication of charging activity, e.g., indicator 130 may emit a sound when device 137 is fully charged. Charging region 135 may receive device 137, as discussed herein.

Flexible body 255 may be made of any suitable material or combination of suitable materials, e.g., silicone, synthetic fibers, and/or polycarbonate and other plastics. The composition of flexible body 255 may enable flexibility and/or bendability of flexible body 255.

Flexible wireless charger 253 may be stored within housing 125 (FIG. 1A). To move between the first position and the second position, flexible wireless charger 253 may be moved manually, by mounting system 127 (FIG. 1B), or by other means. Flexible wireless charger 253 may be moved and/or stored in housing 125 in a rolling motion or format. For example, moving flexible wireless charger 253 from the second position to the first position may be accomplished by the user rolling flexible wireless charger 253 and inserting it into housing 125.

Figure 3:
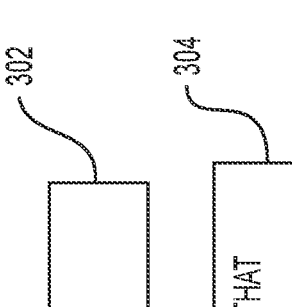
FIG. 3 depicts a flowchart of an exemplary method for operating a computing device with an incorporated wireless charger, according to one or more embodiments.

FIG. 3 depicts a flowchart of an exemplary method 300 for operating a computing device with an incorporated wireless charger, according to one or more embodiments. Method 300 may include moving a wireless charger between a first position and a second position, then while the wireless charger is in the second position, operating the wireless charger such that the wireless charger is configured to charge a device received by the charging region.

At step 302, the wireless charger may be moved between a first position and a second position. For example, wireless charger 105 may be selectively moveable between a first position and a second position. In the first position, charging region 135 may be positioned inside housing 125. In the second position, charging region 135 may be positioned outside of housing 125 and may be configured to receive device 137 for charging. The manner in which charging region 135 may be inside housing 125 may be dependent on the type of wireless charger 105, housing 125, and/or mounting system 127. For example, foldable wireless charger 223 may be in a folded state inside a cuboid-shaped housing 125. In another example, flexible wireless charger 253 may be in a rolled state inside a cylindrical-shaped housing 125.

Charging region 135 may be moved between the first position and second position manually (e.g., by the user), mechanically (e.g., by mounting system 127), by another suitable means, or by any combination thereof. For example, the user may use their hand to move wireless charger 105 from the first position to the second position. In some embodiments, mounting system 127 may move or support the movement of wireless charger 105 from the first position to the second position. In some embodiments, activation of actuator 109 may cause mounting system 127 to move between the first position and the second position. Actuator 109 may be in any suitable form, such as a button or a switch. For example, a user may press actuator 109 to activate mounting system 127, which may cause wireless charger 105 to move from the first position to the second position.

The motion used to move wireless charger 105 between the first position and the second position may be dependent on the type of wireless charger. In some embodiments, movement of wireless charger 105 between the first position and the second position may include a rolling or folding motion. For example, foldable wireless charger 223 may be moved from the first position to the second position by folding foldable body 225 using one or more flexion points 230. In another example, flexible wireless charger 253 may be moved from the first position to the second position by rolling flexible body 255.

In the second position, charging region 135 may be positioned outside of housing 125. Charging region 135 may be configured to receive a device for charging when in the second position. The degree to which wireless charger 105 may be outside of the housing may depend on the type of portable computer 102, wireless charger 105, and/or mounting system 127. For example, a portion less than the whole of charging region 135 of solid-state wireless charger 205 may be outside of housing 125 when in the second position. In another example, the entirety of charging region 135 of flexible wireless charger 253 may be outside of housing 125 when in the second position.

Portable computer 102, wireless charger 105, actuator 109, mounting system 127, and/or indicator 130 may receive power from internal power sources (e.g., the battery) and/or external sources. The battery may selectively charge and/or power portable computer 102, wireless charger 105, actuator 109, mounting system 127, indicator 130, or any combination thereof. For example, the battery may power wireless charger 105 and actuator 109 when portable computer 102 is not turned on and is not receiving power from the internal battery.

External power sources may include a power bank, a charger, a two- or three-pronged outlet, and/or a USB port, or any other suitable source. The internal and external sources of power may operate simultaneously to charge and/or power different aspects of the device. For example, a three-pronged outlet may provide power to the battery, which may provide power to portable computer 102, while the battery may provide power to wireless charger 105, actuator 109, and/or mounting system 127.

As discussed herein, indicator 130 may be connected to wireless charger 105 and may make audio and/or visual indications of the activity of charging region 135, the charge level of device 137, or any other suitable indication. For example, indicator 130 may emit a red light when indicator 130 is inactive and a green light when indicator 130 is active.

At step 304, with the wireless charger in the second position, the wireless charger may be operated such that the wireless charger is configured to charge a device received by the charging region. For example, wireless charger 105 may be in a second position and configured to charge device 137. Wireless charger 105 may be activated by any suitable means, including by activation of actuator 109, by movement of mounting system 127, by movement of wireless charger body 123, by detection of device 137 in charging region 135, or by any other suitable means.

In some embodiments, activation of actuator 109 may activate wireless charger 105, mounting system 127, or both wireless charger 105 and mounting system 127. For example, a user may activate actuator 109, causing wireless charger 105 and mounting system 127 to activate, mounting system 127 then moving wireless charger 105 from the first position to the second position. In another example, a user may activate actuator 109 a first time, causing only mounting system 127 to activate. The user may activate actuator 109 a second time, activating wireless charger 105. In another example, a user may activate actuator 109, causing only mounting system 127 to activate. The user may then activate wireless charger 105 by placing device 137 in charging region 135.

In some embodiments, the movement of mounting system 127 may activate wireless charger 105. For example, a user may activate mounting system 127 using actuator 109 to move wireless charger 105 from the first position to the second position, the movement of wireless charger 105 causing wireless charger 105 to activate.

In some embodiments, wireless charger 105 may be activated by the movement of wireless charger body 123. The type of movement that may activate wireless charger 105 may depend on the type of wireless charger body 123, e.g., solid-state body 207, foldable body 225, or flexible body 255. For example, foldable wireless charger 223 may be activated when the one or more flexion points 230 are moved in a folding or unfolding movement. In another example, flexible wireless charger 253 may be activated when flexible body 255 is moved in a rolling movement.

In some embodiments, wireless charger 105 may be activated by one or more sensors that detect the presence of device 137 in charging region 135. As discussed above, wireless charger 105 may include one or more sensors. The one or more sensors may be incorporated within charging region 135, wireless charger body 123, or any other suitable aspect of wireless charger 105. The one or more sensors may detect when device 137 may have been received by charging region 135. The one or more sensors may be proximity sensors, photoelectric sensors, motion sensors, ultrasonic sensors, NFC sensors, RFID sensors, Bluetooth sensors, any other suitable type of sensor, and/or any combination thereof. After the one or more sensors detect the presence of device 137, wireless charger 105 may activate.

Wireless charger 105 and/or the one or more sensors may be configured to determine characteristics of device 137, such as the type of device 137 received by charging region 135. For example, the one or more sensors may determine that headphones, rather than a cell phone, may have been received by charging region 135. In some embodiments, wireless charger 105 and/or the one or more sensors may dynamically charge the detected device based on the device's charge rate, charge capacity, battery quality, battery type, or the like. For example, wireless charger 105 may provide less charge to headphones than to a cell phone due to the lower charge capacity of the headphones compared to the cell phone.

In some embodiments, one or more charging regions 135 may be inactive while other charging regions are active. Charging region 135 activity may be selective in response to sensing device 137 in a particular charging region 135. For example, device 137 may be placed in one of three charging regions 135, causing the corresponding charging region 135 to activate while the other charging regions 135 remain inactive.

While the disclosed methods, devices, and systems are described with exemplary reference to a laptop with an incorporated wireless charger, it should be appreciated that the disclosed embodiments may be applicable to additional types of computing devices, such as tablet, cell phones, desktop computers, etc. Also, the disclosed embodiments may be applicable to any type of wireless charger.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments may be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, a tablet may have a cuboid housing, a flexible wireless charger, and a slot mounting mechanism. Each aspect of the present invention may be added or deleted to customize the device to an individual's preference.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computing device comprising:
   a housing that defines an interior of the computing device;
   a wireless charger that is selectively moveable, via a remote activated actuator, from a folded first position to an unfolded second position via a folding motion, wherein in the folded first position, a charging region of the wireless charger is within the interior of the housing, and in the unfolded second position, the charging region of the wireless charger is outside of the housing and is configured to receive a device for charging,
   the remote activated actuator comprising a spring-loaded locking mechanism that releases the wireless charger from the folded first position to the unfolded second position when remotely activated; and
   a sensor of the computing device that detects a battery capacity of the device when received at the charging region.

2. The computing device of claim 1, wherein the computing device is a portable computer.

3. The computing device of claim 1, wherein the wireless charger includes an indicator that is configured to visually indicate an activation status of the wireless charger.

4. The computing device of claim 1, wherein the wireless charger is removable from the computing device.

5. The computing device of claim 1, wherein the charging region has a shape that corresponds to at least a portion of a shape of the device for charging.

6. The computing device of claim 1, further comprising a mounting system configured to support movement of the wireless charger between the folded first position and the unfolded second position.

7. The computing device of claim 6, wherein the mounting system includes one or more of a tray, a slot, or a top-load.

8. The computing device of claim 1, further comprising a battery that is operatively connected to the wireless charger independently of the computing device.

9. The computing device of claim 8, wherein the battery is configured to selectively charge the wireless charger, the computing device, or both of the wireless charger and the computing device.

10. The computing device of claim 1, wherein the computing device includes a port that is configured to receive power from an external power source and that is operatively connected to the wireless charger.

11. The computing device of claim 1, further comprising:

a battery operatively connected to the wireless charger and operable to power the computing device independently of the battery operatively connected to the wireless charger, wherein the battery is configured to selectively charge wireless charger, the computing device, or both of the wireless charger and the computing device.

12. A method for operating a wireless charger comprising:

activating a remote actuator to wirelessly activate the wireless charger via a short-range transmitter:

based on a receiver of the wireless charger receiving a transmission via the short-range transmitter, unlocking the wireless charger from a folded retained position to an unfolded position, wherein in the folded retained position, a charging region of the wireless charger is positioned inside a housing, and in the unfolded position, the charging region of the wireless charger is positioned, via an unfolding motion, outside of the housing and is configured to receive a device for charging; and with the wireless charger in the unfolded position, operating the wireless charger such that the wireless charger is configured to charge a device received by the charging region.

13. The method of claim 12, further comprising removing the wireless charger from inside of the housing.

14. The method of claim 12, wherein the wireless charger is moved using a mounting system that supports movement of the wireless charger between the folded retained position and the unfolded position.

15. The method of claim 12, further comprising detecting, by a sensor, a battery capacity of the device received at the charging region using the wireless charger.

16. The method of claim 12, further comprising:

in response to the wireless charger moving from the folded retained position to the unfolded position, activating the wireless charger.

17. The method of claim 12, further comprising:

detecting, via one or more sensors, a presence of the device in the charging region, wherein the wireless charger is activated in response to detecting the presence of the device in the charging region.

18. The method of claim 12, further comprising:

causing a battery operatively connected to the wireless charger to selectively charge the wireless charger, the battery also operatively connected to a computing device positioned in the housing, the battery operatively connected to the wireless charger independent of the battery operatively connected to the computing device.

19. A computing device comprising:

a housing that defines an interior of the computing device;

a wireless charger that is selectively moveable, via a remote activated actuator, from a first folded state to a second unfolded state, wherein in the first folded state, two or more charging regions of the wireless charger are positioned within the interior of the computing device, and in the second unfolded state, the two or more charging regions of the wireless charger are positioned, via automatic unfolding, outside of the housing and configured to receive one or more devices for transmitting electrical energy to a battery of the one or more devices, the two or more charging regions joined by one or more flexion points;

an indicator configured to visually indicate an activation status of the wireless charger; and a mounting system comprising a spring-loaded locking mechanism that releases the wireless charger from the first folded state to the second unfolded state when remotely activated and that supports movement of the wireless charger between the first folded state and the second unfolded state.

20. The computing device of claim 19, further comprising:

a battery operatively connected to the wireless charger and operable to power the computing device independently of the battery operatively connected to the wireless charger, wherein the battery is configured to selectively charge wireless charger, the computing device, or both of the wireless charger and the computing device.

* * * * *